E. M. LAWLER.
VARIABLE SPEED CLUTCH.
APPLICATION FILED AUG. 28, 1912.
1,059,940.
Patented Apr. 22, 1913.
2 SHEETS—SHEET 1.
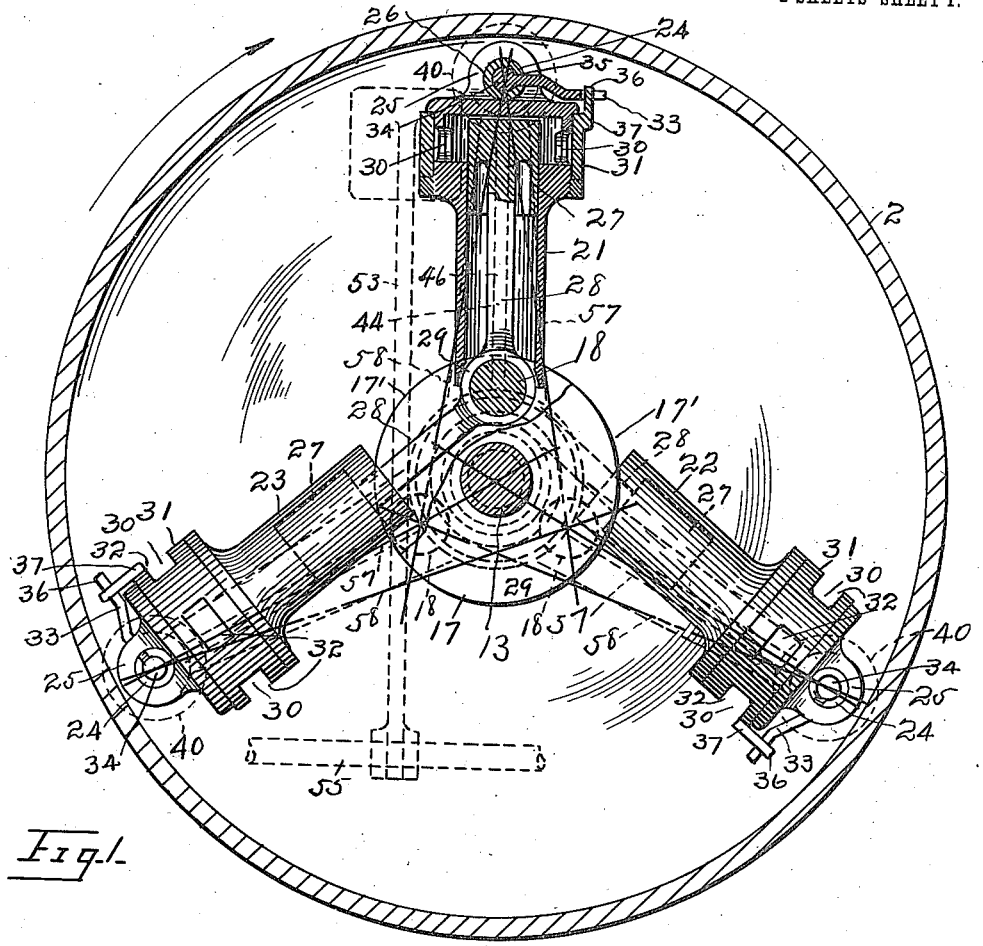
Fig. 1.
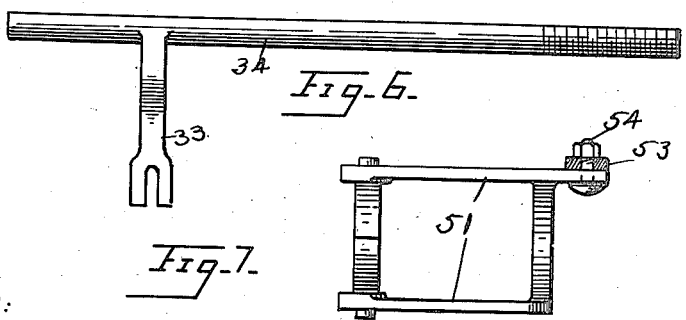
Fig. 6.
Fig. 7.
WITNESSES:
P. R. Brewer
G. De Wallace
INVENTOR.
Edward M. Lawler.
BY Harry D. Wallace
ATTORNEY.

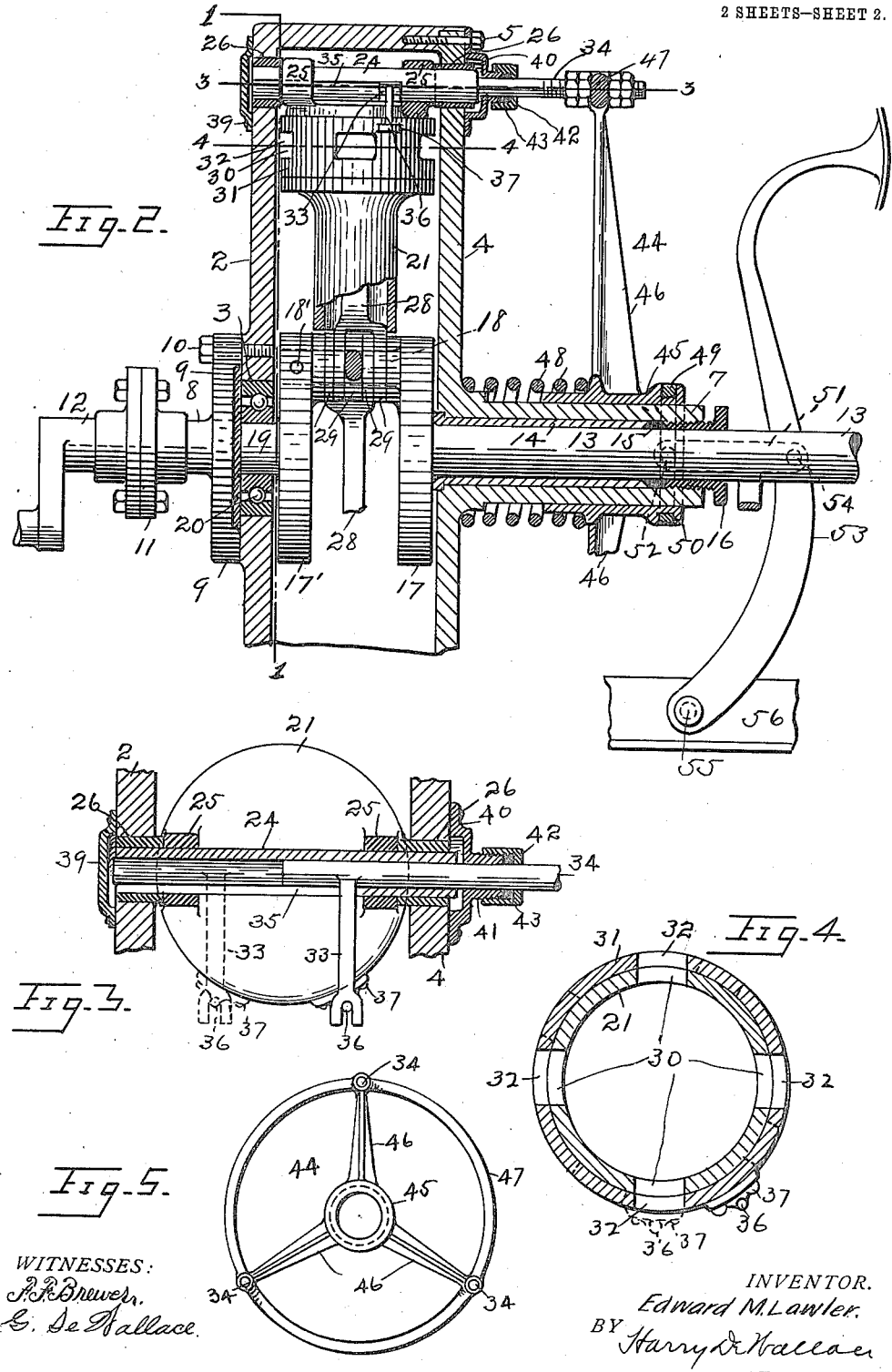

UNITED STATES PATENT OFFICE.

EDWARD M. LAWLER, OF SYRACUSE, NEW YORK.

VARIABLE-SPEED CLUTCH.

1,059,940.  Specification of Letters Patent.  Patented Apr. 22, 1913.

Application filed August 28, 1912. Serial No. 717,523.

*To all whom it may concern:*

Be it known that I, EDWARD M. LAWLER, a citizen of the United States, residing at Syracuse, in the county of Onondaga and State of New York, have invented certain new and useful Improvements in Variable-Speed Clutches, of which the following is a specification.

This invention relates to improvements in fluid clutches, designed for use in connection with engines or other sources of power, and the invention relates particularly to a variable speed transmission or drive for automobiles and motorcylces.

The object of the invention is to provide a novel, simple, effective and compact clutch mechanism of the class for transmitting power derived from an engine or other source, by means of an incompressible fluid, without the use of any gears.

A further object is to provide a fluid clutch or drive which is capable of being readily and quickly adjusted and set for driving another mechanism at any speed from zero to the highest speed of the source of power.

A further object is to provide a variable speed clutch or transmission which is capable of being applied to, or of taking the place of, the usual fly-wheel of an engine, thereby reducing the number of parts and also economizing in the space required to install the device. And a further object is to provide novel and simple valves and valve-operating-parts for controlling the pumping of the fluid.

The advantages and features of the invention will be understood from the detail description which follows, and by reference to the accompanying drawings which form a part of the specification, and in which—

Figure 1 is a vertical longitudinal section, taken on line 1—1 of Fig. 2; showing the construction, arrangement and operation of the main parts of the device. Fig. 2 is a central vertical cross-section, with parts broken away; showing one of the cylinders or pumps; also showing the mechanism employed for opening and closing the valve. Fig. 3 is an enlarged detail section, taken on line 3—3 of Fig. 2 showing the valve operating mechanism. Fig. 4 is a similar section taken on line 4—4 of Fig. 2; showing the construction and arrangement of the valve carried by each cylinder. Fig. 5 is a reduced view of the spider which operates the several valves. Fig. 6 is a detail view of the reciprocating valve-lever. Fig. 7 is a plan view of the trunnion yoke.

In the drawings, 2 represents a hollow circular casing having one open and one closed end, the closed end or back having a central socket or recess 3.

4 represents a circular cap or head for closing the open end of the casing. The cap 4 is preferably inserted in a recess which surrounds the open end of the casing, and is held in place by bolts 5, which are threaded into the casing. The cap 4 is preferably packed in a suitable manner for rendering the joint liquid tight. The outer face of the cap 4 is provided with a concentric hub or sleeve 7. The casing 2 may be attached to and driven by an engine or other power device, and for the purpose of illustrating this feature of the invention, the casing is mounted upon a shaft 8, one end of which has a flange 9, which is secured to the closed end of the casing by bolts 10. The opposite end of the shaft 8 is fitted with a flange 11, which may connect with the crank-shaft, as 12, of an engine. When my clutch or transmission device is applied to a gas or other engine, it may take the place, and serve the purpose of the usual fly-wheel, and whether or not the casing 2 is connected directly to an engine, the said part is intended to be constantly rotated or driven by the engine.

The mechanism for transmitting the power from the engine to another machine or device will now be described: 13 represents an auxiliary shaft disposed in line with shaft 8, and which is journaled in the sleeve or hub 7 of the cap 4, in which is disposed a bushing 14, packing 15, and a gland-nut 16. The outer end of the shaft 13 may be connected to any device to be driven. The inner end of the shaft 13 is fitted with a double crank which comprises the usual spaced disks 17 and 17', and a wrist-pin 18, the latter being preferably detachably connected to the disk 17' by a pin 18'. 19 represents a gudgeon, or shaft, which is carried by the disk 17', and is disposed in line with shafts 8 and 13, and which projects into the socket 3 of the casing, in which it is rotatably supported by means of ball-bearings 20. 21, 22 and 23 represent similar cylinders, which are spaced equidistant within the casing 2, and comprise parts of a series of fluid pumps, by means of which the variable power or speed is produced. The outer ends of the cylinders are pivoted to the casing 2, by means of tubular shafts or sleeves 24, which pierce lugs 25 formed on the outer ends of the cylinders. The sleeves 24 also pierce the back of the casing 2, and the cap 4, by means of suitable perforations 26. The opposite ends of the cylinders 21, 22 and 23 are open. 27 represents a piston carried by each of the cylinders, which is mounted upon one end of a rod 28, the opposite ends of the rods 28 being formed into loops or rings 29 which encircle and bear upon the pin 18 of the crank. The piston rods of the cylinders 21 and 22 are preferably formed into yokes, while the piston rod of the cylinder 23 has a single ring 29, (as best seen in Fig. 2).

In carrying out the object and working of my device, the casing 2 is filled with a fluid which preferably consists of an oil, but may be any other suitable liquid, and the power transmitted from the casing 2 to the shaft 13, is effected by the pumping of the oil by means of the reciprocating of the pistons 27, when operated by the crank carried by said shaft. The oil contained in the casing 2 is admitted to the closed ends of the cylinders by means of a series of ports 30 which are spaced around the outer enlarged portions of the cylinders. The flow of the oil into and out of the cylinders is controlled by annular valves 31, which surround the enlarged portions of the cylinders, and these valves are provided with ports 32, which are arranged to register with the ports 30 when the valves are open, as shown in Figs. 2 and 4, and the valves 31 are adapted to be rotated in one direction for closing the ports 30 for preventing the passing of the oil, as shown by dotted lines in Fig. 4. The valves 31 are operated by levers or arms 33, which are arranged at right angles to and carried by a reciprocating plungers or rods 34, which are disposed in the sleeves or bushings 24, which pivotally support the cylinders. The levers or arms 33, project through the play in longitudinal slots 35 which are formed in the bushings 24. The outer or free ends of the levers 33 are provided with yokes, which straddle pins 36, which are carried by lugs 37 disposed on the outer surface of the valves 31. The longitudinal movement of the rods 34, as indicated by the full and dotted lines in Fig. 3, effects the partial rotation of the valves 31 for opening and closing the ports 30. 39 represents a series of caps which are mounted upon the closed end of the casing 2, concentric to the openings 26 and the bushings 24, for preventing the escape of the oil at these points. 40 represents similar caps which are mounted upon the cover 4 at the opposite ends of the bushings 24. The caps 40 are perforated centrally and provided with necks 41, which are threaded to receive gland-nuts 42, in which are disposed packings 43 for preventing the escape of the oil around the rods 34. The valve rods 34 are operated simultaneously by means of a spider 44, which comprises a hub 45 which is slidable upon the sleeve 7, a series of arms 46 which extend radially from the hub, the outer ends of said arms being perforated to receive the rods 34, and an annular ring or guard 47 which connects the outer ends of the arms 46 for strengthening them. 48 represents a spring which is coiled around the sleeves 7 and 45, one end of which bears against the cap 4, the other end engages the spider 44. The spring 48 exerts its power for forcing and holding the spider away from the casing, as best seen in Fig. 2, for maintaining the valves in open position. 49 represents a trunnion-ring which is disposed in a groove 50 which encircles the outer end of the hub 45. The trunnion-ring 49 is employed for operating the spider in the direction for closing the valves 31, or against the tension of the spring 48. 51 represents a yoke, the arms of which connect with the trunnion-ring 49 by means of oppositely disposed pins 52. The opposite end of the yoke 51 is pivoted to a lever 53 by a pin or bolt 54. The part 53 may consist of the usual foot lever carried by automobiles, or the said lever may be arranged for operating by hand. The lever 53 may be disposed in any suitable position and may be pivotally connected, as by pin or shaft 55, to a support 56.

The operation of my fluid clutch or drive is as follows: Assuming that the cylinders 21, 22 and 23 are properly disposed in the casing 2, and that the casing is filled with oil. The engine or other source of power is started and effects the rotation of the casing 2. At this time the valves 31 should be in the open position indicated in Figs. 1, 2, 3 and 4, in which position they are normally held by spring 48 when the lever 53 is in the released position shown. While the valves are in the open position as described, the casing 2 rotates, but the shaft 13 and its crank and the pistons 27 stand still, because the ports 30—32 are all open. Then as the casing rotates, cylinders 21, 22 and 23 are reciprocated in regular order on the pistons 27, which draws the oil into the cylinders and forces it out again without moving the pistons or the shaft 13. After the engine and the casing 2 has attained the proper speed and everything is in readiness for starting the machine to be driven, the operator should press the upper end of the lever 53 toward the casing 2, which will move the spider 44 and the rods 34 in the same direction for closing the valves 31, as indicated by the dotted lines in Figs. 3 and 4. As soon as the valves begin to close the free passage of the oil into and out of the cylinders is restricted, and the resistance thereby offered effects the starting of the shaft 13 and related parts. At first the movement of the shaft 13 will be slow, and then as the valves are closed to a greater extent, the speed of the shaft 13 will increase, until it equals the speed of the casing 2 and the driving shaft 8, which will be the maximum speed of both the driving and the driven parts. Under this arrangement an automobile or other mechanism may be operated at any speed from zero to the maximum, by means of my fluid clutch. The increase and decrease of the speed of the driven parts may be readily, conveniently and accurately controlled by and through the lever 53. When the valves 31 are open to any extent, the oil will be sucked in and forced out of each cylinder once each revolution of the casing or fly-wheel 2, and at such times the cylinders and piston-rods will oscillate correspondingly to the travel and swing of the crank-pin 18, as indicated by the full and dotted lines in Fig. 1, wherein the dotted lines 57 and 58 indicate respectively the constantly changing centers of the cylinders and the crank-pin, when these parts are rocked and rotated during each revolution of the casing 2. When however, the valves 31 are entirely closed, the rotary motion of the crank, and also the reciprocating movement of the pistons and cylinders cease, and then these parts and the shaft 13 will rotate in equal time with the casing 2, and shaft 13 will then operate at its maximum speed. As long as the lever 53 is held in the operated position for closing the valves 31, the casing 2 and shaft 13 will operate at the same speed. To slow down or stop the driven parts, the lever 53 should be moved toward the position shown in full lines in Fig. 1, which will open the valves 31, and allow the pumping of the oil.

Having thus described my invention, what I claim as new and desire to secure by Letters Patent, is—

1. In a clutch, a hollow casing adapted to be constantly rotated by a source of power, a fluid filling said casing, a driving member comprising a series of cylinders disposed radially in said casing, each of said cylinders oscillatably supported by a sleeve which pierces the casing, a rotary valve surrounding each cylinder for controlling the passage of the fluid to and from the cylinder, a reciprocating valve-rod disposed in each of said sleeves, means for operatively connecting said valve-rods with said rotary-valves, automatic means for operating said valve-rods in one direction, and independent means for operating said valve-rods in the opposite direction.

2. A variable speed clutch, comprising a hollow fly-wheel filled with a fluid, a plurality of oscillating cylinders pivoted in said fly-wheel and extending radially, said cylinders adapted to rotate with the fly-wheel, and each having a plurality of circumferential ports, a shaft journaled in said fly-wheel, having a crank disposed substantially concentric to said cylinders, pistons in said cylinders connecting with and adapted to drive said crank and shaft, rotary valves surrounding said cylinders having ports corresponding to and adapted to coincide with the ports in the cylinders for allowing the passage of the fluid, means for automatically operating said valves in one direction simultaneously, and means for manually operating said valves in the opposite direction.

3. A variable speed clutch, comprising a hollow fly-wheel filled with fluid, a plurality of oscillating cylinders pivoted inside the fly-wheel and extending radially, said cylinders adapted to rotate with said fly-wheel, a shaft journaled in said fly-wheel having a crank disposed substantially concentric to the said cylinders, pistons in said cylinders connecting with and adapted to drive said crank and shaft, valves carried by the pivoted ends of said cylinders adapted to permit or prevent the passage of the fluid to and from the said cylinders, a spring for normally holding said valves in open position for preventing the driving of said shaft, and means for partially and then fully closing said valves for first starting and then increasing the speed of the said shaft until it equals the speed of said fly-wheel.

4. In a clutch, a hollow casing adapted to be constantly rotated by an engine, a fluid filling said casing, a driving member comprising a series of cylinders disposed radially in said casing, each of said cylinders supported by a sleeve which pierces said casing, a valve carried by each cylinder for controlling the passage of the fluid to and from said cylinder, a valve-rod carried by each of said sleeves and slidable therein, a spider carried by said casing and connected to said valve-rods, a spring for holding said spider away from said casing for opening said valves, and means for moving said spider toward said casing for closing said valves.

In testimony whereof I affix my signature in presence of two witnesses.

EDWARD M. LAWLER.

Witnesses:
E. C. WRIGHT,
HARRY DE WALLACE.